Oct. 29, 1968 C. D. DICKINSON ET AL 3,408,230
METHOD OF MAKING FLEXIBLE ELECTRODES
Filed Dec. 21, 1964

INVENTORS.
CLAYTON D DICKINSON
IRVING SHEINHARTZ

BY
R. J. Frank
ATTORNEY.

United States Patent Office 3,408,230
Patented Oct. 29, 1968

3,408,230
METHOD OF MAKING FLEXIBLE ELECTRODES
Clayton D. Dickinson, Port Washington, and Irving Sheinhartz, Bayside, N.Y., assignors to General Telephone and Electronics Laboratories, Inc., a corporation of Delaware
Filed Dec. 21, 1964, Ser. No. 419,936
5 Claims. (Cl. 136—25)

ABSTRACT OF THE DISCLOSURE

A method of making flexible negative electrodes wherein an iron-containing substrate is placed in a mixture of aluminum oxide, aluminum powder and a halide. The substrate and mixture are then heated in a reducing atmosphere to form an iron aluminide coating metallurgically bonded to the substrate. The substrate is next placed in a caustic solution to dissolve out the aluminum thereby forming a negative electrode.

---

Figure 1:
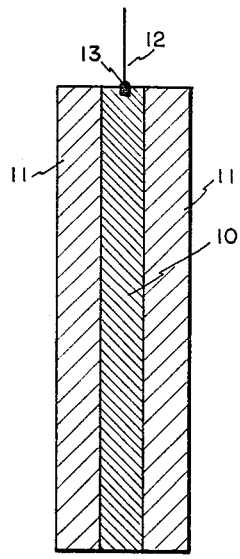

This invention relates to negative electrodes for alkaline batteries and to methods of making such electrodes.

In Edison cells, the negative electrode is conventionally formed by filling nickel screen pockets with iron powder produced by the reduction of finely divided iron oxide. However, these electrodes tend to have high self-discharge rates and to be unsatisfactory at high charge and drain rates. Also, the process by which they are made involves several individual steps in which a finely divided material is handled thereby increasing the complexity and cost of manufacture.

Accordingly, it is an object of our invention to provide an improved iron negative electrode fro secondary alkaline batteries.

Another object is to provide an iron negative electrode for alkaline batteries which employs a core having relatively high electrical conductivity and good mechanical properties.

Still another object is to provide a negative electrode which is flexible and may be fabricated by a simple, efficient and relatively inexpensive process.

Yet another object is to provide a negative secondary electrode having a fully dense iron core rather than the relatively mechanically weak porous sheet heretofore employed.

A further object is to provide an iron negative electrode which will permit the construction of a cell having greater capacity for a given weight or volume and which will provide higher drain rates than are now available in conventional alkaline cells employing iron negative electrodes.

In the present invention, a negative electrode is provided which comprises an iron substrate or core having an electrochemically active coating metallurgically bonded to the substrate. The coating consists of active iron which is defined as iron containing a high concentration of lattice defects, i.e., at least ten percent of the atoms normally present in the lattice structure of iron are missing. Preferably, the core is formed of fully dense iron in order to obtain maximum conductivity and mechanical strength. However, an iron alloy sheet having additions of silicon, nickel, cobalt, or similar metals may also be used as the electrode core.

The active coating is metallurgically bonded to the iron core by processes to be described hereinafter in such manner that there is a sharp line of demarcation between the coating and the substrate. By metallurgically bonded it is meant that at the interface the distance between the atoms of the substrate and the coating is on the order of an atomic diameter.

The negative electrode is formed by bringing aluminum into contact with the surface of the iron-containing core at an elevated temperature thereby interdiffusing the aluminum and iron to form a layer of iron aluminide ($Fe_2Al_5$). After the iron aluminide layer has been formed to the desired thickness on the core, the structure is placed in a caustic solution to dissolve out the diffused aluminum. The dissolution step produces a layer of active iron metallurgically bonded to the iron containing core. This layer of active iron has atomic hydrogen and some residual aluminum distributed therethrough. A portion of the atomic hydrogen is adsorbed on to the iron layer and the remainder is contained within the atomic lattice of the iron.

The resultant structure can be used as a negative electrode in a secondary cell. It is flexible ad therefore can be used in a variety of cell configurations.

Figure 2:
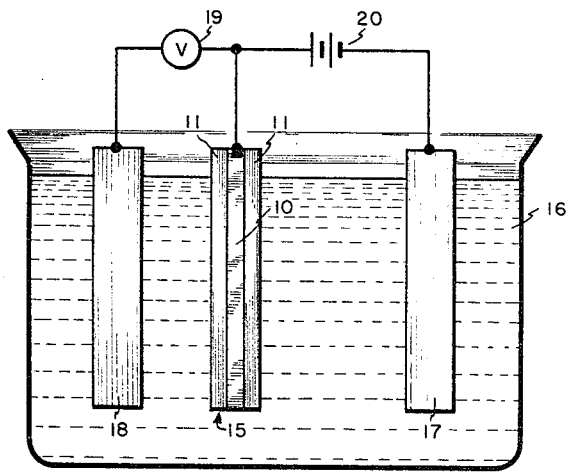

The above objects of and the brief introduction to the present invention will be more fully understood and further objects and advantages will become apparent from a study of the following description in connection with the drawings, wherein:

FIG. 1 is a schematic diagram of the electrode showing the active coating bonded to the substrate, and FIG. 2 is a diagram showing an alkaline test cell employing the electrode.

Referring to FIG. 1, there is shown a negative electrode comprising a solid substrate or core 10 having an electrochemically active iron coating 11 metallurgically bonded thereto. A lead 12 is secured to the core 10 by a tab 13. The coating 11 consists essentially of active iron but may contain as much as 50 atomic percent hydrogen and up to 15 weight percent aluminum uniformly distributed throughout the iron. Although a fully dense iron core is preferred since it provides greatest electrical conductivity and mechanical strength, the core may have some porosity and still be acceptable. However, it shall be noted that should a porous core be employed the coating 11 does not impregnate the pores but is bonded to the surface of the substrate 10.

In making the negative electrode, a 100 percent dense iron sheet having a thickness of about 0.010 inch was selected for use as the substrate. The thickness of the core is not critical and depends upon the conductivity of the core material and the desired capacity of the electrode. In general, the capacity of the electrode increases with the thickness of the coating and therefore to obtain an electrode having maximum volume, the thinnest core consistent with good mechanical strength and current capacity should be used.

Certain alloys of iron such as iron containing 10 to 15 percent nickel and iron containing 3 to 5 percent silicon have been used in place of iron as a starting material. The elements stabilize respectively the face-centered cubic and body-centered cubic crystal structures of iron at the coating temperature and reduce distortion of the electrode during diffusion. Other alloying elements in amounts needed to stabilize one or the other crystal structures may be used in place of nickel or silicon with similar results.

The iron sheet was placed in a pack consisting of a mixture of approximately 58 percent aluminum oxide ($Al_2O_3$), 40 percent aluminum powder and 2 percent ammonium chloride ($NH_4Cl$). The composition of the mixture is not critical and wide variations are permissible. Other halides, such as ammonium fluoride ($NH_4F$) and sodium fluoride (NaF) may also be used in place of ammonium chloride. The iron substrate and surrounding mixture were heated in a reducing atmosphere for 8 hours at 800° C. and then cooled to room temperature. The resulting structure consisted of an iron core 10 covered by an approximately 0.007 inch layer 11 of iron aluminide ($Fe_2Al_5$). (In addition, trace amount of $FeAl_3$ are sometimes formed on the surface of the $Fe_2Al_5$ and zones of another aluminide, believed to be FeAl, may form at the interfaces between the substrate and the coating.) A reducing atmosphere composed of hydrogen was used in producing the iron aluminide coating although an inert atmosphere such as argon may also be employed.

The thickness of the coating is determined by the duration and temperature of the diffusion process, temperatures in the range 625°–900° C. giving satisfactory results. In the case described, a 0.007 inch coating was obtained by diffusing for 8 hours at 825° C.

The coated iron core was next immersed in a solution containing a 6 normal sodium hydroxide solution at a temperature of 80° C. for about 16 hours. At the end of this period at least 85 perecnt of the aluminum was dissolved out of the structure forming a negative electrode. The reaction of the aluminum with the sodium hydroxide solution removes the aluminum from the $Fe_2Al_5$ leaving behind iron containing a large concentration of defects as a direct result of the removal of aluminum. Part of these defects contain atomic hydrogen released by the reaction of the aluminum with the sodium hydroxide. It has been found that the dissolution step may be carried out at temperatures in the range 20°–100° C. for periods of from 1 to 32 hours and that potassium hydroxide may be used in place of sodium hydroxide.

The resultant electrode comprised a solid, non-porous iron substrate or core having an electrochemically active iron coating which can be used as a negative electrode in a secondary cell. Its capacity as a reversible electrode is determined by the amount of iron originally in the active coating as $Fe_2Al_5$.

An electrode 15 having a width of 0.5 inch, a length of 2.5 inches and a 0.007 inch active coating on each side was formed as described. As shown in FIG. 2, this electrode (termed the working electrode) was placed in an electrolyte 16 consising of a 33 percent solution of potassium hydroxide together with a solid nickel counterelectrode 17 and a mercuric oxide reference electrode 18. The potential of the working electrode 15 was measured with respect to the reference electrode 18 with a voltmeter 19 while the cell was discharged at a constant current imposed by an external D.C. source 20. It was found that the potential of the working electrode 15 dropped from −0.9 volt to −0.6 volt while delivering 300 milliampere hours to the load.

The negative electrodes described are extremely flexible and can literally be twisted into almost any configuration without damage. For example, electrodes 0.02 inch thick were bent double with a zero bend radius without damage to their mechanical or electrochemical integrity. Batteries can therefore be designed to utilize electrodes of more complex and efficient shape than has heretofore been possible. Further, the reversible capacity of these electrodes per gram of aluminum gained during coating is 365 milliampere hours. In addition, the high electrical conductivity of the solid iron core makes charging and discharging rates higher than that of conventional pocket electrodes feasible.

An electrode was prepared by the method just described except that the pack method was not used for forming the iron aluminide. In lieu thereof, the iron sheet was rolled between two aluminum sheets to form a metallic bond. The iron sheet and bonded aluminum were then heated in a reducing (or inert) atmosphere at a temperature of 1100° F. to form $Fe_2Al_5$. Preferably, temperatures below 1200° F. are used in this method although temperatures as high as 1600° F. may be used.

As many changes could be made in the above described processes and many different embodiments could be made without departure from the scope thereof, it is intended that all matter contained therein shall be interpreted as illustrative and not in a limiting sense.

What is claimed is:
1. A method of making a flexible iron negative electrode comprising the steps of:
   (a) placing a substrate consisting essentially of iron in a mixture of aluminum oxide, aluminum powder and a halide and heating said substrate and mixture in a reducing atmosphere to a temperature in the range 625° to 900° C. to form an iron aluminide coating metallurgically bonded to said substrate, and
   (b) placing said iron aluminide coated substrate in a caustic solution to dissolve out the aluminum to form a negative electrode.

2. A method of making a flexible iron negative electrode comprising the steps of:
   (a) placing a substrate consisting essentially of fully dense iron in a mixture consisting of approximately 58 percent aluminum oxide, 40 percent aluminum powder and 2 percent of a halide,
   (b) heating said substrate and mixture in a reducing atmosphere to a temperature in the range 625° to 900° C. to form an iron aluminide coating metallurgically bonded to said substrate, and
   (c) placing said iron aluminide coated substrate in a caustic solution at a temperature of about 80° C. until essentially at least 85 weight percent of the aluminum is dissolved out thereby forming a negative electrode.

3. The method of making a flexible negative electrode disclosed in claim 2 wherein the iron aluminide coating is bonded to the iron substrate by heating to about 800° C. for approximately 8 hours in a hydrogen atmosphere.

4. The method of making a flexible negative electrode disclosed in claim 2 wherein the halide is selected from the group consisting of ammonium chloride, ammonium fluoride and sodium fluoride.

5. A method of making a flexible negative electrode comprising the steps of:
   (a) rolling a sheet consisting essentially of iron between two aluminum sheets to form a metallic bond therebetween,
   (b) heating said bonded sheet and aluminum to a temperature of approximately 1100° C. in a reducing atmosphere to form an iron aluminide coating on said substrate, and
   (c) dissolving the aluminum out of said iron aluminide coating to form a negative electrode.

References Cited
UNITED STATES PATENTS

| | | | |
|---|---|---|---|
| 3,096,205 | 7/1963 | De Guisto | 117—107.2 |
| 3,286,684 | 11/1966 | Aves | 117—107.2 |
| 3,345,197 | 10/1967 | Martini et al. | 117—107.2 |
| 2,884,688 | 5/1959 | Herz | 29—182 |
| 3,068,157 | 12/1962 | Vielstich et al. | 136—86 X |
| 3,081,366 | 3/1963 | Belove | 136—6 |
| 3,140,172 | 7/1964 | Coad | 75—135 X |
| 3,202,544 | 8/1965 | Vielstich | 136—6 |
| 3,239,380 | 3/1966 | Berchielli | 136—6 |

OTHER REFERENCES

Gray et al.: The Defect Solid State, 1957, pages 402–403, Scientific Library.

WINSTON A. DOUGLAS, *Primary Examiner.*

A. SKAPARS, *Assistant Examiner.*